Figures 1, 2:
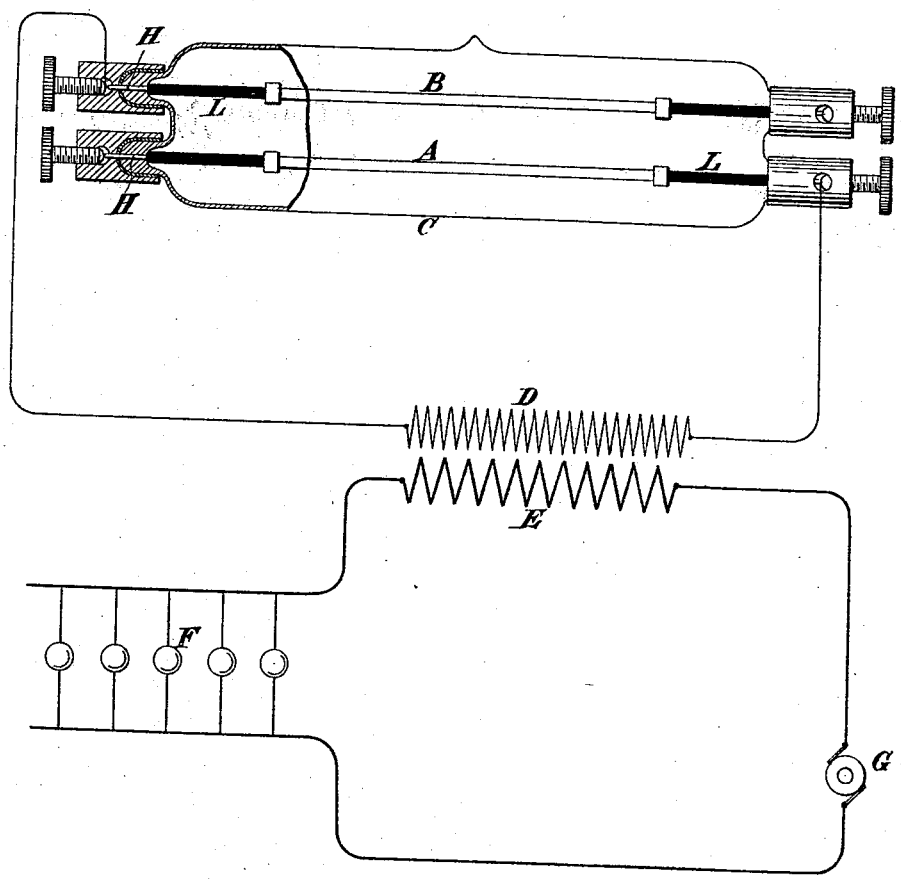

(No Model.)

N. TESLA.
ELECTRICAL METER.

No. 514,973.                    Patented Feb. 20, 1894.

Witnesses:
Raphael Netter
James H. Catlow

Inventor
Nikola Tesla
by Duncan & Page
Attorneys

UNITED STATES PATENT OFFICE.

NIKOLA TESLA, OF NEW YORK, N. Y.

ELECTRICAL METER.

SPECIFICATION forming part of Letters Patent No. 514,973, dated February 20, 1894.

Application filed December 15, 1893. Serial No. 493,739. (No model.)

*To all whom it may concern:*

Be it known that I, NIKOLA TESLA, a citizen of the United States, residing at New York, in the county and State of New York, have invented certain new and useful Improvements in Electrical Meters, of which the following is a specification, reference being had to the drawings accompanying and forming a part of the same.

The subject of this invention is a novel method of and apparatus for computing the energy that has been expended in a given time in a circuit, and is more particularly designed for measuring the expended energy of alternating currents and those of varying strength.

The invention is based on the fact that when a high tension discharge is made to pass from a conductor through a rarefied gas, minute particles are thrown off from the conductor and are embodied in any apparatus in which the proper conditions for the above results are present, and in which the amount of the particles thrown off from the conductor or conductors as a result of such action is in proportion to the strength of the current, the energy of which is to be computed, and can be measured from time to time. As the most convenient means of utilizing this principle in carrying out my invention, I have devised an instrument of the following character: In a tube or other receiver, preferably of glass, are placed two conductors, parallel to each other. The most convenient conductors for this purpose are composed of thin sticks or filaments of homogeneous carbon, to the ends of which platinum wires are attached, which latter are sealed in the glass, and, inside the tube protected by a coating of some insulating material, while their ends outside of the tube are connected to or formed as suitable terminals. The glass tube is provided with a small tube through which it is exhausted to the proper degree and which is sealed off after exhaustion in the usual manner. If the two conductors or carbons be connected to the two parts of a circuit over which flows an alternating current of high tension, a discharge takes place from one carbon to the other alternately, that causes infinitesimal particles to be thrown off from each, which appreciably increases their electrical resistance. This variation may be used as a measure of the energy of a current in a working circuit, as I shall now explain more in detail and by referring to the drawings hereto annexed, and in which—

Figure 1 illustrates the instrument above described and, diagrammatically, the manner of using the same. Fig. 2 is a cross section on an enlarged scale of one of the carbon conductors.

One terminal of each of the carbon conductors A, B, sealed as above described in the tube or receiver C, is connected to a terminal of the secondary D of a high tension induction coil, preferably constructed without iron. The carbons are supported by the metallic conductors H, preferably of platinum in whole or in part, and having inside the receiver a coating of insulating material L. The primary E of the induction coil is connected in series with incandescent lamps or other non-inductive translating devices F, supplied with alternating currents from any suitable generator G. Under these conditions, since the difference of potential at the terminals of the secondary of the induction coil is proportionate to the primary current, it is, therefore, proportionate to the number of lamps or other devices F.

The action of the discharge in the tube C from one conductor to the other produces a uniform throwing off of the infinitesimal particles of carbon along the entire length of the conductors, as the difference of potential between the two is practically equal at all points, and the increase in resistance will, therefore, be uniform. The amount, however, of the particles thus thrown off in a given time is proportionate to the difference of potential between the two conductors, and hence the increase in the resistance of the conductors is in a definite proportion to the number of lamp hours. Thus, the energy may be computed from the variation in the resistance of the conductors in the following manner: The resistances of the conductors are accurately measured in any of the usual ways. Then a known current is caused to pass for a given time through the primary of the induction coil and a given number of lamps. The resistances of the conductors are then taken again and the increase gives the constant which permits of the calculation of the energy consumed from the variation in the resistance of one conductor.

To simplify the calculation, the carbon conductors may be made rectangular in cross-section, see Fig. 2, which is an enlarged cross-section of one of the carbons, coated with an insulating substance M, so as to expose only one side from which the material is thrown off. In such case the variation of resistance may be simply multiplied by the constant to determine the energy. But it is an easy matter to determine by a simple calculation the amount of energy expended in any case, provided the dimensions of the conductors are known. The former plan is preferable, however, as by it the energy may be directly read off by using a properly graduated ohm meter.

If inductive resistances be used in place of the lamps F, it will be understood that the conditions for ascertaining the energy expended must be varied accordingly and in well understood ways, which require no special description herein.

I do not limit myself to the specific construction of the instrument herein shown, for the same may be varied in many well understood ways. For example, only one of the two conductors need be inside the tube, it being only necessary that they be placed in such relations that the high tension discharge shall take place between them through the rarefied gas.

The above described plan I regard as the most convenient for ascertaining the amount of the particles thrown off from the conductors, but other means for this purpose may be resorted to.

What I claim as my invention is—

1. The method, herein described, of measuring the amount of electrical energy expended in a given time in an electric circuit of alternating currents, which consists in maintaining by such currents a high tension discharge through a rarefied gas between two conductors, and computing from the amount of the particles thrown off from said conductors or one of the same by the action of the discharge of the energy expended.

2. The combination with a circuit of alternating currents, of a meter composed of two conductors connected respectively with the circuit and separated by a rarefied gas substantially as set forth.

3. The combination with a working circuit of alternating currents, translating devices substantially as described connected therewith, a primary coil in series with the translating device and a high tension secondary therefor, of a meter composed of an exhausted receiver having two conductors sealed therein, one terminal of each conductor being connected to a terminal of the secondary, as set forth.

4. A meter for electric currents, consisting in the combination with an exhausted receiver, of two conductors contained therein and connected with wires sealed into the walls of said receiver, the said meter having two line or circuit terminals, one connected with each conductor, therein, as set forth.

5. A meter for electric currents, consisting in the combination with an exhausted receiver of two rectangular carbon conductors mounted therein and coated with an insulating material on three sides, as and for the purposes set forth.

6. A meter for electric currents, consisting in the combination with an exhausted receiver, of two carbon conductors presenting surfaces between which a discharge is adapted to take place, and metallic conductors sealed in the walls of the receiver and supporting said carbons, the metallic conductors inside the receiver being coated with an insulating material, as set forth.

NIKOLA TESLA.

Witnesses:
JAMES N. CATLOW,
PARKER W. PAGE.